United States Patent [19]

Mayle

[11] 3,780,339

[45] Dec. 18, 1973

[54] HIGH SPEED SWITCHING CIRCUIT FOR DRIVING A CAPACITIVE LOAD

[75] Inventor: Alfred J. Mayle, Palo Alto, Calif.

[73] Assignee: Computer Power Systems, Inc., Sunnyvale, Calif.

[22] Filed: May 3, 1971

[21] Appl. No.: 139,775

[52] U.S. Cl. ............ 315/27 TD, 307/127, 307/254, 307/255, 315/30

[51] Int. Cl. ............ H01j 29/70

[58] Field of Search ............ 315/30, 27 TD; 307/254, 255, 127, 246, 270, 228; 328/78; 336/105

[56] References Cited

UNITED STATES PATENTS

| | | | |
|---|---|---|---|
| 3,492,502 | 1/1970 | Chang | 307/246 |
| 3,588,539 | 6/1971 | Milan | 307/246 |
| 3,396,233 | 8/1968 | Kagan | 315/30 X |
| 3,435,256 | 3/1969 | Young | 307/270 X |
| 3,426,245 | 2/1969 | Yurasek et al. | 315/27 TD |
| 3,418,495 | 12/1968 | Bose | 307/246 X |
| 3,611,001 | 10/1971 | Bacon | 315/27 TD |
| 3,628,083 | 8/1969 | Holmes et al. | 315/27 TD |

OTHER PUBLICATIONS

IBM Techical Disclosure Bulletin, R. J. Froess, "Current Reversal In Inductive Loads," Vol. 11, No. 10, March 1969.

*Primary Examiner*—Leland A. Sebastian
*Attorney*—Flehr, Hohbach, Test, Albritton & Herbert

[57] ABSTRACT

A high speed switching circuit especially useful for driving a capacitive load includes two dc voltage sources of equal magnitude which are selectively coupled to a capacitive load such as a multicolor cathode ray display tube. The polarity of voltage on the capacitive load is switched positive to negative and vice versa by coupling the capacitive load to an inductor and allowing the subsequent transfer of energy to switch the polarity of the stored voltage on the capacitive load.

7 Claims, 5 Drawing Figures

INVENTOR.
ALFRED J. MAYLE
BY
Flehr, Hohbach, Test, Albritton & Herbert
ATTORNEYS INVENTOR.
ALFRED J. MAYLE
BY
Flehr, Hohbach, Test, Albritton & Herbert
ATTORNEYS

INVENTOR
ALFRED J. MAYLE

BY

Flehr, Hohbach, Test, Albritton & Herbert
ATTORNEYS

HIGH SPEED SWITCHING CIRCUIT FOR DRIVING A CAPACITIVE LOAD

BACKGROUND OF THE INVENTION

The present invention is directed to a high speed switching circuit for driving a capacitive load. More particularly, one type of capacitive load may be a beam penetration type cathode ray multicolor display tube.

In a multicolor display tube of the above type the speed of color selection is limited by the switching speed of the anode voltage to the tube. Since the tube is an effective capacitive load, the charging and discharging times of this load normally limit switching speed.

Normal switching circuits which place a switch directly between a capacitive load and a power source dissipate large amounts of power in the switch. Since the charging current for the capacitor will be flowing through the switch at the same time there is still a large voltage across the switch. The present invention eliminates this problem by allowing all switches to fully turn on or off with either no current through them or no voltage across them.

OBJECTS AND SUMMARY OF THE INVENTION

It is, therefore, an object of the invention to provide a high speed switching circuit for a capacitive load.

It is another object of the invention to provide a switching circuit as above which is especially useful for providing complex graphic displays on a beam penetration multicolor cathode ray tube.

It is another object of the invention to accomplish the foregoing high speed switching with minimal power dissipation in the switch elements so that the circuit may be operated at high repetition rates without excessive power dissipation.

In accordance with the above objects a high speed switching circuit for driving a capacitive load comprises two unidirectional voltage sources of equal absolute magnitudes. A pair of switching means is provided for selectively coupling the capacitive load to one or the other of the voltage sources. One source is coupled to a load in an opposite polarity sense as the other source. Means forming a current path between the capacitive load and the voltage sources include inductive means responsive to current in such path for generating a voltage opposed in polarity to the stored voltage of the capacitive load. Switching means complete this current path in response to both of the pairs of switching means being in an open condition.

DETAILED DESCRIPTION OF THE PREFERRED EMBODIMENT

Figure 1:
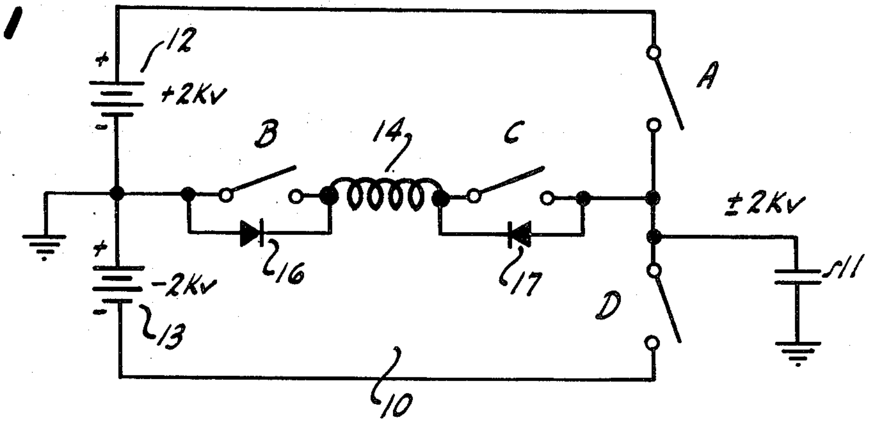
FIG. 1 is a simplified circuit schematic embodying the present invention.

A simplified circuit schematic of the switching circuit of the present invention is shown in FIG. 1 at 10 and it is illustrated as driving a capacitive load in the form of a capacitor 11. Two unidirectional or dc voltage sources 12 and 13 of equal absolute magnitudes have their negative and positive terminals respectively coupled to ground. A nominal voltage of +2 kV is indicated for dc source 12 and −2 kV for dc source 13. However, the present invention is useful in any switching situation where power dissipation in the switches may be a problem. The positive and negative terminals of dc sources 12 and 13 are selectively coupled to capacitor 11 in opposite polarity senses by switches A and D. Since the other side of capacitor 11 is coupled to ground the voltage across the capacitor swings between a positive and negative 2 kV.

Figure 2:
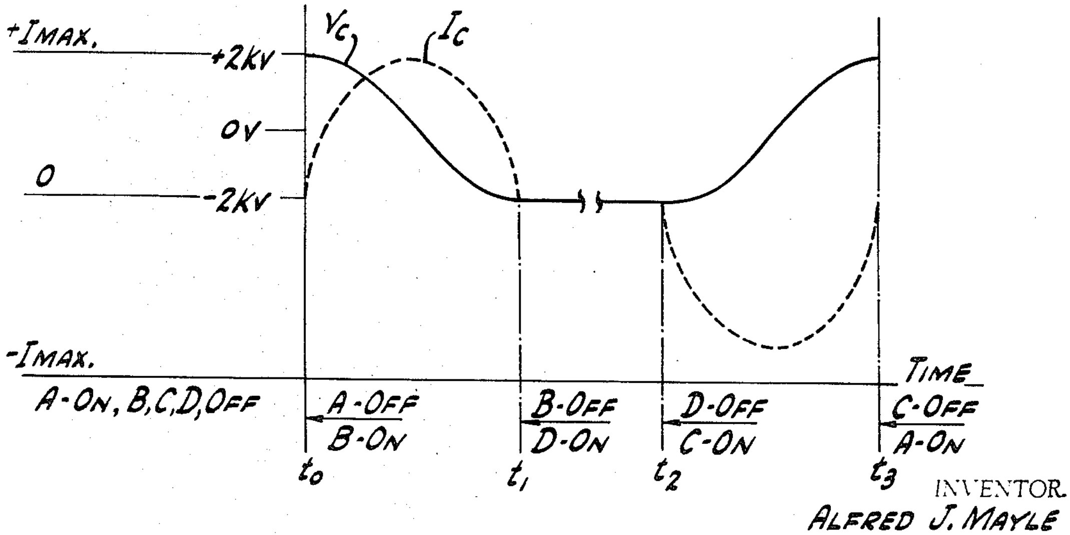
FIG. 2 shows waveforms useful in understanding the circuit of FIG. 1.

This illustrated in FIG. 2 where the solid waveform designated $V_c$ is the voltage across capacitor 11. The specific manner in which this voltage varies between ±2 kV will be explained below.

A current path is formed between capacitor 11 and the dc voltage sources 12 and 13 by an inductor 14 and series connected switches B and C which are also coupled between capacitor 11 and the ground terminal between the + and − terminals of sources 12 and 13. Shunting switches B and C are diode means 16 and 17 which are connected in opposite senses so that, for example, each diode will only conduct current of one polarity. The current through the current path of switches B and C and capacitor 11 is illustrated in FIG. 2 as the dashed waveform $I_c$.

In operation, the circuit of FIG. 1 might have the following sequence of events as illustrated in FIG. 2 starting from the time $t_0$ to the time $t_3$. The time axis of FIG. 2 also has designated on it the respective conditions of switches A, B, C and D; that is, whether they are ON or OFF (or closed or open). Before time $t_0$ it is assumed that switch A is ON thus applying +2 kV to capacitor 11, and switches B, C and D are off. When it is desired to, for example, switch the voltage across the capacitor 11 from +2 kV to −2 kV, switch A is turned off and switch B on. Current then flows from capacitor 11 through diode 17 and switch B back to ground. The initial change of current is sufficiently large so that the voltage generated by inductor 14 in response to this change in current is equal to the voltage on capacitor 11. In other words, at time $t_0$ the voltage across inductor 14 is +2 kV. When the voltage across the capacitor decreases to zero the current $I_c$ is a maximum as shown by FIG. 2 but since it has a zero slope no voltage is generated by inductor 14. At this point, the current $I_c$ switches to a negative slope decreasing in value toward zero which causes the inductor 14 to generate a voltage in response to this change in current of an opposite polarity. This is illustrated as $V_c$ going negative toward −2 kV. When the value is reached, the capacitor 11 is now charged to −2 kV and switch D is closed, permanently applying this value of voltage by way of voltage source 13 to capacitor 11 without any energy loss in the switch. At this time, $t_1$, switch B is opened and switch D is closed to maintain −2 kV on capacitor 11.

A change of voltage from −2 kV to +2 kV is accomplished in a similar manner as illustrated in FIG. 2 except that switch D is opened and switch C closed whereupon the current flows through a current path including switch C and diode 16 in the negative sense and the voltage, $V_c$, across capacitor 11 goes through its zero point and then to +2 kV. At this time, $t_3$, switch C is opened and switch A is closed to maintain +2 kV on capacitor 11.

The foregoing switching may, of course, be carried out cyclically with the time between $t_1$ and $t_2$ merely being a few microseconds to allow for settling. In practice, the time between $t_0$ and $t_1$ is approximately 10 microseconds. It is apparent from the foregoing discussion of the operation of the circuit of FIG. 1 that the LC resonance between capacitor 11 and inductor 14 is being utilized to provide for a rapid transfer of energy between the two components which results in an effective change of polarity across capacitor 11. If resistances in the circuit are kept to a minimum, this can be accomplished rapidly thereby providing the high switching speeds of the present invention.

Figure 1A:
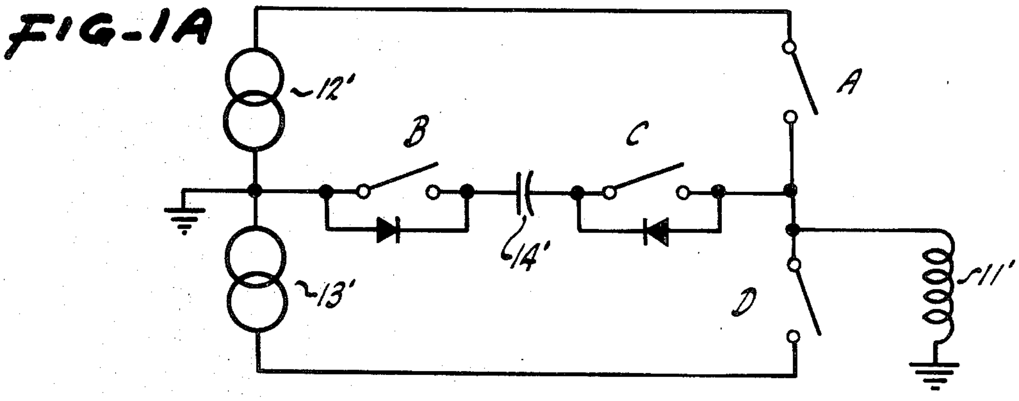
FIG. 1A is a dual circuit of FIG. 1.

FIG. 1A is a dual of FIG. 1 and illustrates an inductive load 11' being driven by a circuit having a capacitive storage element 14' and current sources 12' and 13'. The waveforms of FIG. 2 describe its operation except that $I_c$ is the voltage across capacitor 14' and $V_c$ is the current through inductor 11'.

Figure 3:
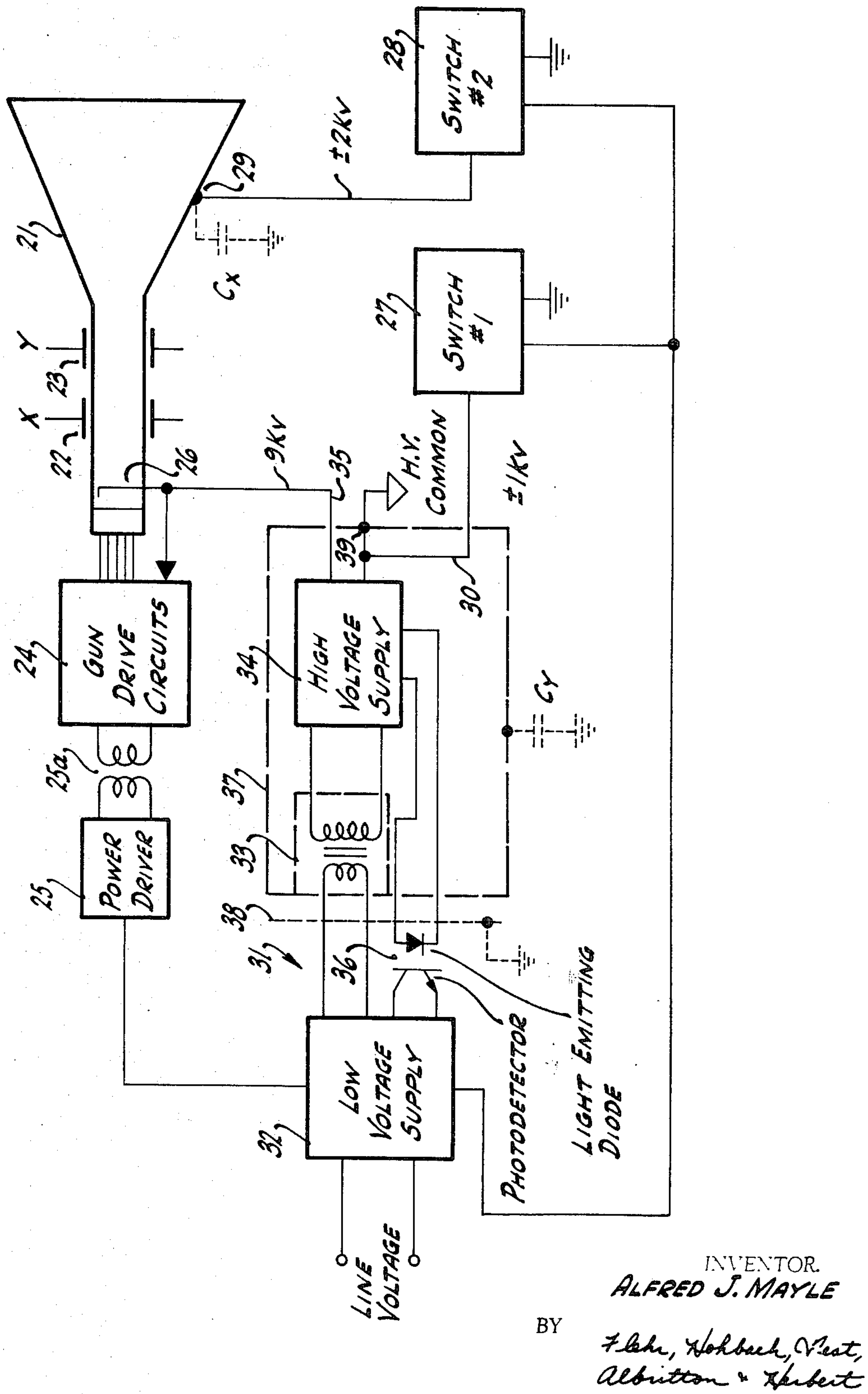
FIG. 3 is a block diagram showing the use of the circuit of FIG. 1 with multicolor cathode ray tube.

The present invention finds preferred use in conjunction with a beam penetration multicolor cathode ray display tube as shown in FIG. 3. The tube is indicated at 21 with X and Y electromagnetic deflection units 22 and 23 and a gun drive circuit 24. The tube 21 is commercially available and would normally include a phosphor screen with red and green phosphor layers which are separated by a barrier. The final anode or screen of the cathode ray tube is operated at a potential in one mode of its operation sufficiently low so that electrons will not pass through the barrier and activate the other phosphor layer. In its mode of operation the anode potential is high enough to cause electrons to pass through the first phosphor, through the barrier, and activate the second phosphor layer. Thus, a second primary color is produced. Intermediate values of anode voltage will activate the phosphors proportionately to thereby produce intermediate colors. Other phospher characteristics may also be selectiveoy activated such as persistance.

In order to simplify the operation of tube 21, in accordance with the invention the cathode 26 of tube 21 is operated at a bias of −9 kV. This bias is modulated by ± 1 kV from a switch 27, designated switch No. 1, which is equivalent to the switch of FIG. 1. A second similar switch 28, designated switch No. 2 provides ± 2 kV to the anode button 29 of tube 21. Also indicated as being coupled to anode button 29 is a virtual capacitor $C_x$. Thus, in switching the anode of a cathode ray tube it must be regarded as an effective capacitive load.

Similarly, the ± 1 kV output line 30 of switch 27 modulates a −9 kV bias source 31 which has an effective capacitance to ground designated $C_y$. Bias source 31 is similar to that disclosed and claimed in a copending application entitled "Modulated and Regulated High Voltage Supply" in the names of Alfred J. Mayle and Bernie F. McKay Jackson, Ser. No. 97,526 filed Dec. 14, 1969 and assigned to the present assignee and now abandoned. The major advantage of this modulated high voltage supply is its fast switching time. It includes a low voltage supply 32 which is coupled to, for example, a line voltage energy source. It converts its ac line input to required supply voltages for associated circuits which include switches 27 and 28 and the gun drive circuits 24. Since circuits 24 operate at −9 kV isolation from the low voltage supply is provided by the power driver 25 and associated transformer 25a. Energy from low voltage supply 32 is coupled through transformer 33 to a high voltage supply unit 34. This unit has an output line 35 which is the −9 kV biasing line. Voltage regulation of line 35 is provided by a feedback circuit 36 between high voltage supply 34 and low voltage supply 32. A light emitting diode provides an error voltage to a photodector which is coupled to a control device to regulate the low voltage supply 32.

In order to sufficiently isolate high voltage supply 34, electrostatic shielding means 37 in the form of, for example, a copper mesh box is provided which totally encloses all of the high voltage supply components including transformer 33. A second shield 38, also of copper mesh, serves as additional isolation and is referenced to ground. Shield 37 is tied to a high voltage common at point 29 along with the −1 kV modulating voltage line 30 from switch 27.

In operation, with proper combinations of switching voltages from switches 27 and 28 the effective voltage differences between the cathode 26 and anode 29 of tube 21 includes 6, 8, 10 and 12 kV.

Figure 4:
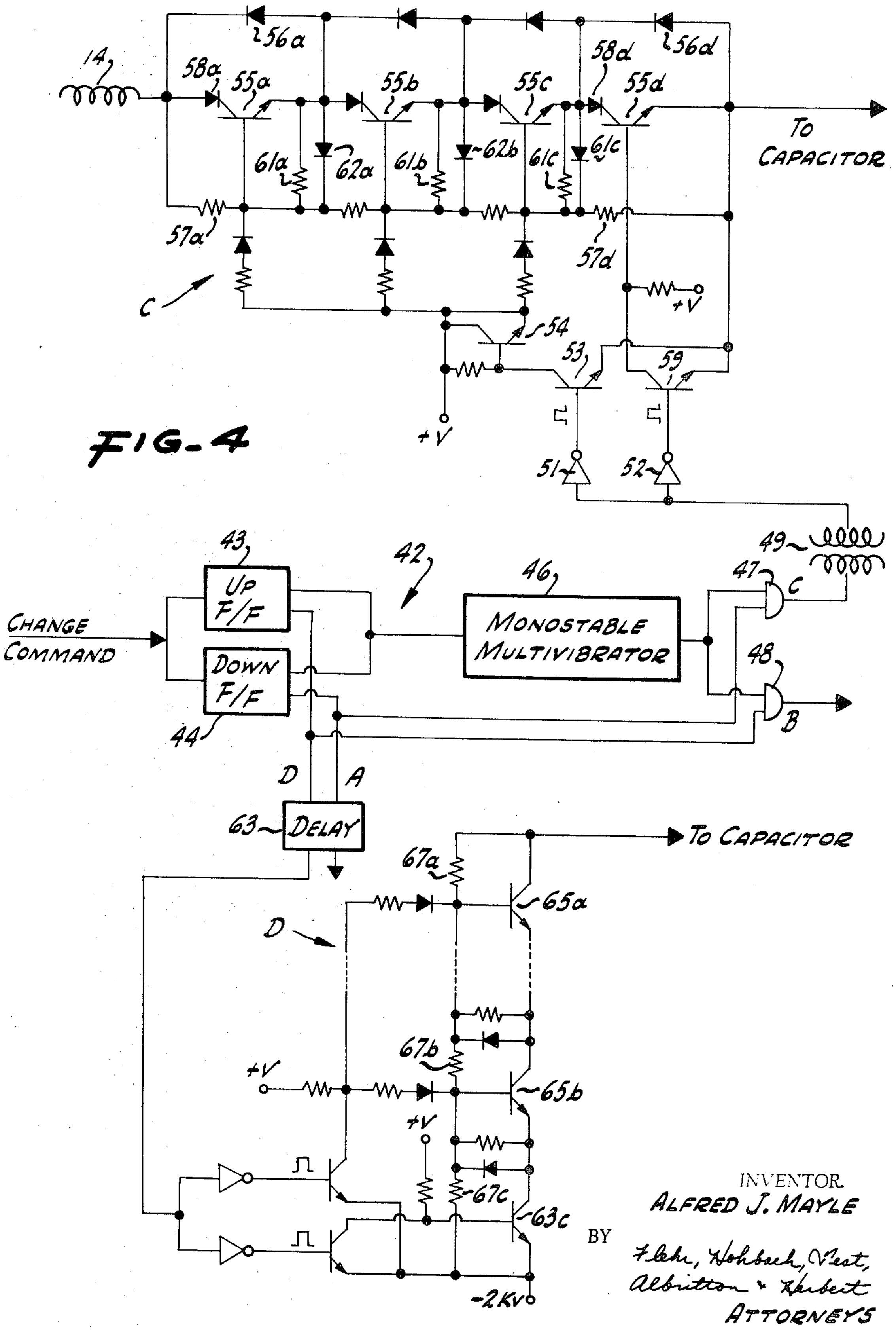
FIG. 4 is a partial detailed circuit schematic of FIG. 1.

FIG. 4 shows a simplified control circuit 42 for the switches A through D of FIG. 1 along with the actual solid state switching units for representative switches C and D. A change command to change the switching voltage from one limit to the other is received by up and down flip-flops 43 and 44. These essentially serve as storage elements to indicate to the switching circuit whether it is at the positive or negative extreme of the switching voltage at the time the change command is received. A monostable multivibrator, normally termed a one shot device, is coupled to the outputs of the flip-flops 43 and 44 and activates through either the AND gates 47 and 48 switch C or switch B depending upon whether a positive or negative $I_c$ will be carried by it. The coincidence inputs of AND gates 47 and 48 are provided by the complementary outputs of the up and down flip-flops 43 and 44.

The output of AND gate 47 is coupled through a pulse transformer 49 to inverters 51 and 52. Inverter 51 is coupled to a transistor 53 which is driven on at, for example, time $t_2$ (FIG. 2) which in turn activates a transistor 54 which acts in effect to speed up the turn-on of the series connected transistors *55a* through *55d*. Transistor *55d* is coupled to the capacitive load which it is modulating and transistor *55a* to the inductor 14. Activation of the transistors *55a* – *55d* in effect closes switch C.

When switch C is open and the switch B is conducting the diodes *56a* through *56d* coupled across the collector-emitter terminals of transistors *55a* – *d* respectively carry the current carried by the other switch and the associated transistors are, of course, in an off condition.

When neither switch B or C is activated a large voltage drop occurs across the switches. In order to provide for an equal drop across each stage of the switch a string of resistors *57a* – *d* are connected between the collector and base of each transistor stage. The value of such resistors would be in the range of several hundred kilohms. When transistors *55a* through *55d* are off or nonconductive but the diodes *56a* through *56d* are conductive, in order to maintain the transistors *55a* – *d* in an off condition series connected diodes *58d* are tied to the collectors of the respective transistors.

When the monostable multivibrator 46 no longer provides an output pulse at the end of the time interval determined by the LC time constant of the basic switching circuit, inverter 52 activates the transistor 59 to open or turn off the transistors 55*a* – *d*. This turn off is enhanced by the parallel clamping circuit which includes the resistor 61*a* – *c* connected between the base and emitters of the respective transistors 62*a* – *c*.

After the voltage on the capacitive load has been switched the switch B or C is turned off and the main line switch A or D turned on or closed. The delay during the change of polarity on the capacitive load is provided, as illustrated in FIG. 4, by a delay unit 63.

Switch D is similar in concept to switch C including a string of series connected transistors 65*a* through 65*c* along with resistors 67*a* – *c* between the base and collector of the transistors for providing equal voltage drops across the transistors. Similar circuit techniques may also be used in connection with the switch D for enhancing the turn on and turn off speeds.

Isolation of the +V voltage supplies of both switch No. 1 and No. 2 from the low voltage supply is provided by transformers with bridge rectifiers in their secondaries to provide the required dc supply voltages.

Thus, the present invention provides a high speed switch especially suited for capacitive loads where switching time is determined essentially by the LC time constant of the switching circuit. Moreover, the switch provides equal switching time in both of the switching directions. Because of its high speed the switch is especially suitable for multicolor cathode ray display tubes. Since the switches all operate at zero current, high power dissipation is minimal permitting high switching repetition rates.

I claim:

1. A high speed switching circuit for driving a capacitive load comprising: two unidirectional voltage sources of equal absolute magnitudes; a pair of switching means for selectively directly and continuously coupling said capacitive load to one or the other of said voltage sources said one source being coupled to said load in an opposite polarity sense as said other source; inductive means; means forming a resonant current path with said capacitive load and said inductive means said inductive means being responsive to current in such path for generating a voltage opposed in polarity to the stored voltage of said capacitive load; and switching means for completing said current path in response to both of said pair of switching means being in an open condition and for interrupting said current path in response to the current in said path being substantially zero.

2. A circuit as in claim 1 where said pair of switching means includes a plurality of series connected transistors coupled between said voltage sources and the load.

3. A circuit as in claim 2 where each of said transistors includes a resistor coupled between the collector and base for equally dividing the voltage across said transistors.

4. A circuit as in claim 1 where said switching means for completing said current path includes first and second pluralities of series connected transistors for respectively carrying current of opposite polarity together with first and second diode means bridging said transistors for respectively carrying current of a polarity opposite the associated series connected transistors.

5. A circuit as in claim 1 where said capacitive load is a cathode ray tube.

6. Beam penetration cathode ray tube display apparatus where the tube is of the type that provides different phosphor characteristics with the switching of its anode voltage comprising:

*a.* first and second switching circuits for driving respective capacitive loads each including two unidirectional voltage sources of equal absolute magnitudes;

*b.* a pair of switching means for selectively directly and continuously coupling said capacitive load to one or the other of said voltage sources, said one source being coupled to said load in an opposite polarity sense as said other source;

*c.* inductive means;

*d.* means for forming a resonant current path with said capacitive load and said inductive load;

*e.* said inductive means responsive to current in such path for generating a voltage to the stored voltage of said capacitive load and switching means for completing said current path in response to both of said pairs of switching means being in an open condition;

*f.* said capacitive load of said first switching circuit being the anode of said tube;

*g.* said apparatus including a modulated and regulated high voltage supply which is coupled to the cathode of said tube and is modulated by said second switching circuit for which it forms a capacitive load.

7. A method of switching the voltage on a capacitive load between positive and negative polarities comprising the steps of, completing a first direct path from a voltage source of positive polarity to said load to charge said load with a positive voltage, interrupting said first path and forming a resonant circuit with said capacitive load and an inductor whereby the initial induced voltage across said inductor is substantially equal and opposite said positive voltage, allowing said circuit to resonant until a negative polarity voltage appears across said capacitive load and the inductor current is substantially zero and substantially concurrently opening said resonant circuit and completing a second direct path from a voltage source of negative polarity to said load to charge said load with a negative voltage.

* * * * *